US011195529B2

(12) United States Patent
Stogner et al.

(10) Patent No.: US 11,195,529 B2
(45) Date of Patent: *Dec. 7, 2021

(54) SYSTEM AND METHOD FOR MANAGING SPEECH RECOGNITION

(71) Applicant: MOTOROLA SOLUTIONS, INC, Chicago, IL (US)

(72) Inventors: Darrell J. Stogner, Sunrise, FL (US); Ellis A. Pinder, Davie, FL (US); Matthew E. Simms, Davie, FL (US); Melanie King, Hollywood, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/821,460

(22) Filed: Mar. 17, 2020

(65) Prior Publication Data

US 2020/0219512 A1 Jul. 9, 2020

Related U.S. Application Data

(63) Continuation of application No. 15/901,295, filed on Feb. 21, 2018, now Pat. No. 10,636,423.

(51) Int. Cl.
*G10L 15/22* (2006.01)
*G10L 15/30* (2013.01)
(Continued)

(52) U.S. Cl.
CPC ............. *G10L 15/22* (2013.01); *G10L 15/18* (2013.01); *G10L 15/20* (2013.01); *G10L 15/30* (2013.01);
(Continued)

(58) Field of Classification Search
CPC ......... G10L 15/22; G10L 15/18; G10L 15/20; H04M 1/72412
(Continued)

(56) References Cited

U.S. PATENT DOCUMENTS 4,525,793 A * 6/1985 Stackhouse ............. H04B 7/26
704/270
5,371,901 A * 12/1994 Reed ...................... H04M 1/271
455/11.1
(Continued)

OTHER PUBLICATIONS

Jong Hoon Ahnn: "A Practical Approach to Scalable Big Data Computing for the Personalization of Services at Samsung". Big Data Computing (BDC), 2014 IEEE/ACM International Symposium on Dec. 8-11, 2014, London, pp. 64-73.‡
(Continued)

*Primary Examiner* — Akwasi M Sarpong
(74) *Attorney, Agent, or Firm* — Barbara R. Doutre

(57) ABSTRACT

A communication system (100) formed of a radio management system (104) interoperates with a radio management codeplug database (106) and a confusability analyzer (108) for the creation and storage of voice recognition target strings for uploading to one or more land mobile portable radios (110) prior to field-deployment. Once the radios are deployed to the field, unrecognized voice command entries are determined, stored locally at the portable radio, and uploaded to cloud based storage (122). Analysis of the cloud based data is performed through a voice control analytics engine (124) to detect patterns associated with the unrecognized voice commands. The unrecognized voice command pattern is processed though a resolution action engine (126) to generate one or more resolution actions for the pattern.

7 Claims, 5 Drawing Sheets

(51) Int. Cl.
*G10L 15/20* (2006.01)
*H04M 1/72412* (2021.01)
*G10L 15/18* (2013.01)

(52) U.S. Cl.
CPC ... *H04M 1/72412* (2021.01); *G10L 2015/223* (2013.01); *G10L 2015/227* (2013.01); *G10L 2015/228* (2013.01); *H04M 2201/40* (2013.01); *H04M 2250/74* (2013.01)

(58) Field of Classification Search
USPC .................. 704/231, 275, 226, 236, 270
See application file for complete search history.

(56) References Cited

U.S. PATENT DOCUMENTS

| | | | | |
|---|---|---|---|---|
| 6,185,530 B1 ‡ | 2/2001 | Ittycheriah | ............. | G10L 15/10 704/24 |
| 6,584,439 B1 * | 6/2003 | Geilhufe | ............. | G06F 3/167 704/270 |
| 6,735,562 B1 * | 5/2004 | Zhang | ............. | G10L 15/01 704/240 |
| 8,005,668 B2 * | 8/2011 | Arun | ............. | G10L 15/22 704/226 |
| 8,977,284 B2 * | 3/2015 | Reed | ............. | G01S 5/0252 455/456.1 |
| 9,330,669 B2 ‡ | 5/2016 | Stonehocker | ............. | G10L 15/30 |
| 9,530,401 B2 ‡ | 12/2016 | Kim | ............. | G10L 15/01 |
| 9,583,100 B2 * | 2/2017 | Burke | ............. | G10L 15/30 |
| 10,692,492 B2 * | 6/2020 | Rozen | ............. | G06F 3/167 |
| 2003/0040281 A1 * | 2/2003 | Nakao | ............. | H04B 7/0854 455/67.11 |
| 2003/0120493 A1 ‡ | 6/2003 | Gupta | ............. | G10L 15/063 704/27 |
| 2005/0086055 A1 * | 4/2005 | Sakai | ............. | G10L 15/01 704/231 |
| 2005/0102142 A1 ‡ | 5/2005 | Soufflet | ............. | G10L 15/18 704/24 |
| 2005/0164684 A1 | 7/2005 | Chen et al. | | |
| 2005/0239507 A1 * | 10/2005 | Doi | ............. | H04B 7/0808 455/562.1 |
| 2006/0069564 A1 ‡ | 3/2006 | Allison | ............. | G10L 15/08 704/25 |
| 2006/0258336 A1 | 11/2006 | Sajor et al. | | |
| 2007/0047719 A1 ‡ | 3/2007 | Dhawan | ............. | G06F 3/167 379/23 |
| 2007/0225049 A1 * | 9/2007 | Andrada | ............. | H04M 1/6066 455/569.1 |
| 2007/0027665 A1 ‡ | 11/2007 | Bliss | ............. | G10L 15/30 704/9 |
| 2007/0276651 A1 * | 11/2007 | Bliss | ............. | G10L 15/30 704/9 |
| 2008/0061122 A1 * | 3/2008 | Klein | ............. | H04W 4/029 235/375 |
| 2008/0132199 A1 * | 6/2008 | Hirata | ............. | H04W 4/029 455/404.2 |
| 2008/0269610 A1 * | 10/2008 | Burla | ............. | G01S 7/5205 600/447 |
| 2008/0294700 A1 * | 11/2008 | Sugimoto | ............. | G06F 16/178 |
| 2010/0268537 A1 * | 10/2010 | Al-Telmissani | ........ | G10L 17/04 704/246 |
| 2011/0307254 A1 * | 12/2011 | Hunt | ............. | G10L 15/26 704/235 |
| 2012/0109646 A1 * | 5/2012 | Bak | ............. | G10L 15/065 704/229 |
| 2013/0083791 A1 * | 4/2013 | Jobert | ............. | H04J 3/0658 370/350 |
| 2013/0183944 A1 * | 7/2013 | Mozer | ............. | H04L 12/282 455/414.1 |
| 2013/0185070 A1 * | 7/2013 | Huo | ............. | G10L 15/063 704/243 |
| 2013/0265905 A1 * | 10/2013 | Filsfils | ............. | H04L 43/08 370/253 |
| 2014/0025377 A1 * | 1/2014 | Koch | ............. | G10L 15/32 704/249 |
| 2014/0067392 A1 * | 3/2014 | Burke | ............. | G10L 15/30 704/236 |
| 2014/0337007 A1 ‡ | 11/2014 | Waibel | ............. | G10L 13/02 704/3 |
| 2015/0066497 A1 ‡ | 3/2015 | Sun | ............. | G06F 16/683 704/23 |
| 2015/0256684 A1 * | 9/2015 | Mohammed | ............. | H04W 8/04 455/406 |
| 2015/0331666 A1 * | 11/2015 | Bucsa | ............. | G10L 15/22 704/275 |
| 2016/0225370 A1 * | 8/2016 | Kannan | ............. | G10L 15/063 |
| 2017/0125020 A1 * | 5/2017 | Seo | ............. | G10L 15/144 |
| 2017/0221475 A1 * | 8/2017 | Bruguier | ............. | G10L 15/063 |
| 2017/0287490 A1 * | 10/2017 | Biswal | ............. | G10L 17/02 |
| 2018/0011838 A1 * | 1/2018 | Beller | ............. | G06F 40/186 |
| 2018/0033435 A1 * | 2/2018 | Jacobs, II | ............. | G10L 15/22 |
| 2019/0058763 A1 * | 2/2019 | Wei | ............. | H04M 1/72412 |
| 2019/0356364 A1 * | 11/2019 | Maamari | ............. | H04L 5/0062 |

OTHER PUBLICATIONS

The International Search Report and the Written Opinion corresponding patent application No. PCT/US2019/014661 filed Jan. 23, 2019, dated Apr. 12, 2019, all pages.‡

Jong Hoon Ahnn: "A Practical Approach to Scalable Big Data Computing for the Personalization of Services at Samsung". Big Data Computing (BDC), 2014 IEEE/ACM International Symposium on Dec. 8-11, 2014, London, pp. 34-73.

\* cited by examiner
‡ imported from a related application

SYSTEM AND METHOD FOR MANAGING SPEECH RECOGNITION

FIELD OF THE INVENTION

The present invention relates generally to communication systems, and more particularly to unrecognized voice command detection and resolution for post-deployed radios.

BACKGROUND

Communication systems, particularly those used in potentially hazardous environments such as law enforcement, fire rescue, heavy industrial, and other mission-critical environments, rely on proper portable radio operations. There is an ever increasing desire for a voice control feature in next generation public safety communication devices, such as land mobile radio (LMR) devices, that will enable users to perform certain radio control operations by using voice as an input medium to the radio device. While some speech recognition options are available on certain types of consumer LTE/broadband devices, such as cellular phones, tablets, and laptops, such voice recognition is not readily available to LMR radio applications due to the limited data rate speeds, narrow bandwidth, and environmental conditions, such as loud noise environments, within which LMR radios operate. Additionally, while speech recognition failures in cell phone operations may or may not be addressed, at the discretion of the cell phone manufacturer based on financial and other viability factors, such discretion is not deemed acceptable in LMR radio operations where the devices are so heavily relied upon for mission critical public safety communications.

Accordingly, there is a need for an optimized voice control feature that improves voice control operation of portable LMR radios in the field.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
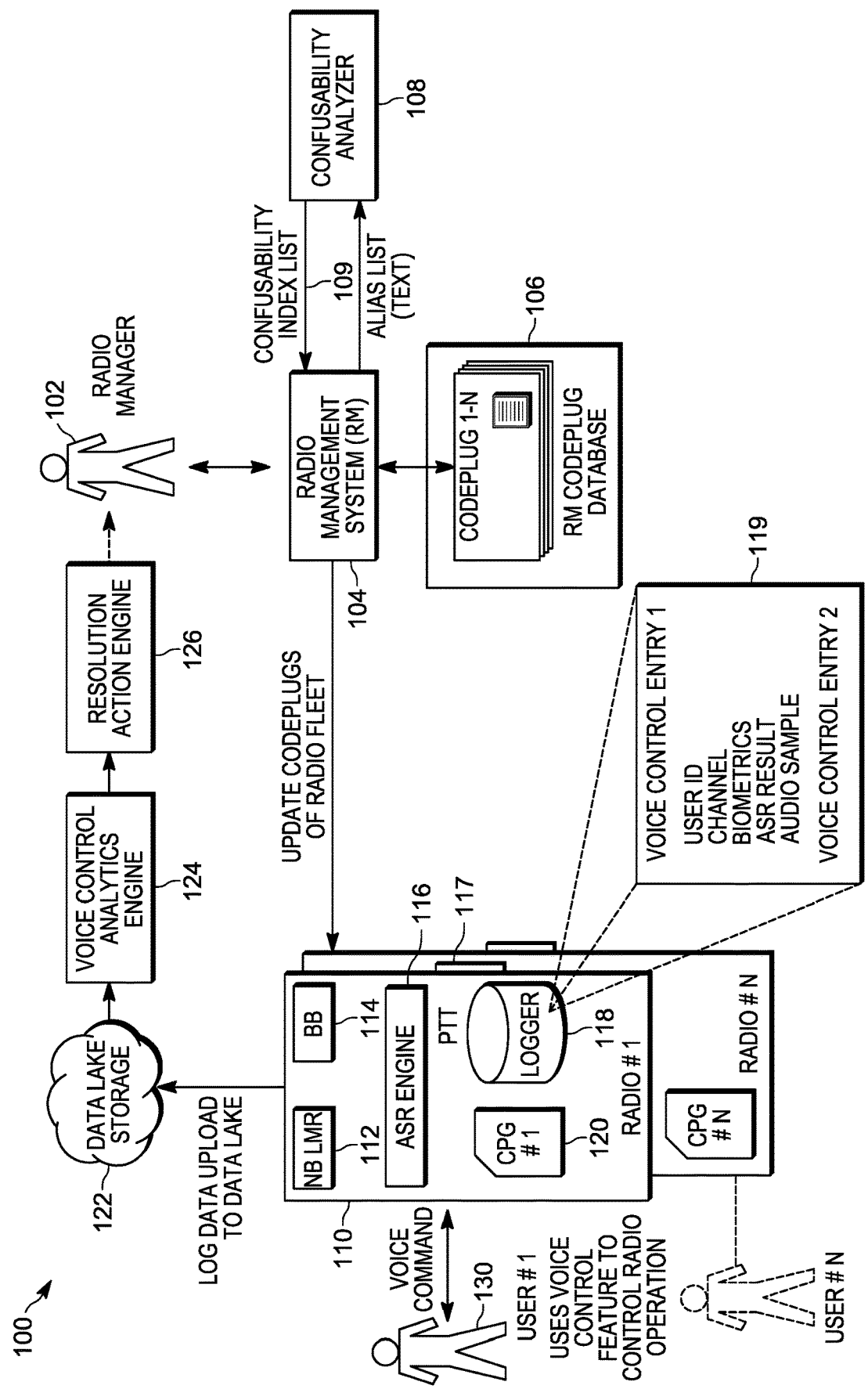
FIG. 1 is a block diagram of a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a system, apparatus, and method for a voice control feature that takes into account a priori conditions for voice recognition prior to radios being deployed in the field, as well as a subsequent analysis and management of voice recognition post-deployment to optimize performance in the field. A three stage approach to adaptive word recognition performance management is provided. The first stage utilizes a confusability analyzer to resolve known recognition issues prior to deployment along with direct, local feedback to a radio manager. The second stage tracks and logs unrecognized voice command commands, post-deployment, locally at the portable radio, with periodic upload of logs to the cloud via a wireless connection. The third stage preferably utilizes a cloud based voice control analytics engine and a resolution action engine for post-deployment unrecognized voice command analysis and generation of resolution actions. The voice control analytics engine performs pattern analytics to determine the type of unrecognized voice command, and the resolution action engine generates one or more potential actions that can be taken to resolve the unrecognized voice command. The resolution actions are sent back to the radio manager for consideration and selection. In some embodiments, the resolution action may be wirelessly communicated to the failed portable radio while the portable radio remains in the field. Other resolution actions may direct the radio to be inspected and/or repaired. For yet other resolution actions, user training may be initiated. The embodiments described herein are particularly advantageous to narrowband LMR radios, such as those used in two-way communications using push-to-talk (PTT) control. The embodiments are preferably directed towards narrowband LMR radios engaging in voice command communications, where unrecognized voice commands are stored locally at the radio and uploaded via a broadband interconnect for cloud based analytics. The embodiments provided herein expeditiously address unrecognized voice commands in public safety LMR speech recognition in a manner that minimizes the occurrence of additional or subsequent unrecognized commands.

FIG. 1 is a block diagram of a communication system 100 formed and operating in accordance with some embodiments. Communication system 100 comprises a radio management system 104 interoperating with a radio management codeplug database 106, a confusability analyzer 108, and one or more portable radios 110. In accordance with the embodiments, the communication system 100 further comprises cloud-based data lake 122, voice control analytics engine 124, and resolution action engine 126. The embodiments apply to a single portable radio, as well as a plurality of portable radios, sometimes referred to as a fleet. Each portable radio 110 provides LMR functionality 112 comprising a controller and transceiver for narrowband operations, such as two-way radio communications. During regular radio operation, transmission of voice is controlled by having the user 130 press a push-to-talk (PTT) button 117 and speak into a microphone of the portable radio 110. In accordance with the embodiments, communication system 100 provides a voice control feature, enabled via a predetermined button press, wake command, or other trigger, which enables the user to enter voice commands (without pressing the PTT button 117) while remaining in two-way (half-duplex) communications. In preferred embodiments, each portable radio 110 may further comprise a broadband wireless interface 114, such as Wi-Fi, LTE 4G, LTE 5G, or some other high-speed wireless broadband interface. In accordance with the embodiments, each portable radio 110 further comprises an automatic speech recognition (ASR) engine 116, a data storage database, referred to as unrecognized voice command data logger 118, and a codeplug 120.

Communication system 100 provides a three stage voice control and optimization system, wherein the first stage provides programming of a priori codeplug file information comprising a plurality of voice recognition target strings to the one or more portable radios 110 (#1-N) prior to deployment of those radios into the field. The radio management system 104 maintains the radio manager codeplug database 106 for programming a fleet of portable radios. The radio manager codeplug database 106 contains one or more codeplugs mapped to the fleet of radios 110, wherein each codeplug comprises a voice recognition target string.

The a priori aspects performed by the radio management system 104 include analysis of a codeplug entered by a radio manager 102 into the codeplug database 106, confusability analysis and the generation of red flag alerts by confusability analyzer 108, indicative of a list of terms being too close to discern by the automatic speech recognition engine 116 of the one or more portable radios 110. The confusability analyzer engine 108 analyzes the plurality of voice recognition target strings from the codeplug database 106 and returns a confusability index list 109, also referred to as a list of confusability indices, indicating the likelihood of confusion between the various voice recognition target strings when later processed by the automatic speech recognition engine 116 of each portable radio 110. Radio management system 104 presents the results to radio manager 102, who may choose alternate words to effect improvements to the confusability index list. Alternately, radio management system 104 may provide suggestions to radio manager 102. The first stage of operation thus programs what is referred to as a "clean" configuration file to each radio 110 prior to deployment in the field. Hence, the codeplug 120 of each radio is pre-programmed with a configuration file of a voice recognition target string.

The second stage of operation, in accordance with the embodiments, occurs while the portable radios 110 are deployed to the field, also referred to as field-deployed radios, where users 130 of the portable radios 110 enter voice commands, upon enabling the voice control feature. The voice control feature can be engaged via a predetermined button, predetermined wake word, or some other trigger. In accordance with the embodiments, an unrecognized voice command in the field can be flagged, stored locally, and periodically wirelessly uploaded from the portable radios 110 to a cloud based data lake 122. For example, a "Select Channel" command may reference a Channel Alias List stored in each codeplug 120. The Channel Alias List contains the name of each channel. To operate this command, the user may speak "Select Channel 'Tactical Two'" The voice recognition may recognize not only the command "Select Channel", but also an expected argument, i.e. the name of the desired channel. As another example, the user may speak "Select Volume 'Level 3'", where "Select Volume" is the voice command, and 'Level 3' is the argument. Hence, the argument is a specific subset of a voice command. Some commands may have a different number of arguments, including no arguments. Recognition, analysis, and logging apply to both the voice command and any applicable arguments associated with the command.

Unrecognized voice commands may arise by a variety of different causes, unanticipated during the initial configuration by the confusability analyzer 108. For example, an added accessory may change a previously stored audio profile, or a blocked microphone port may be causing garbled audio. Additionally, different agencies may use different vernacular, or vernacular specific to their environment, that was unknown to the radio manager 102 at the time of pre-deployment radio configuration. The wireless upload of unrecognized voice command data can be transmitted from each of the portable radios 110 in which the error occurred to the cloud. For example, the unrecognized voice command data can be transmitted from the LMR portable radio 110, over a broadband wireless interface 114, such as Wi-Fi, LTE-4G, LTE 5G, or other high-speed wireless internet interface known, or yet to be developed. Thus, the speech recognition is performed locally at the non-LTE, narrowband portion of LMR radio 110 to produce data logs 119 which are then uploaded from the portable LMR radio 110, using a high speed internet connection, to the cloud.

Unrecognized voice command entries, those which are not recognized as voice recognition target strings, are determined along with data 119 associated with the failed voice command entry, are logged locally at the portable radio and also uploaded to a cloud based data lake 122 during post-field deployment. Analysis of the cloud based data is performed through the cloud based voice control analytics engine 124 to detect a pattern of the unrecognized voice command. The pattern is processed though a resolution action engine 126 to generate one or more resolution actions for the unrecognized voice command pattern.

In accordance with the embodiments, the third stage of operation utilizes the cloud based voice control analytics engine 124 to analyze the stored unrecognized voice commands to determine unrecognized voice command patterns. The unrecognized voice command patterns are transferred to the resolution action engine 126 where one or more proposed resolution actions to the unrecognized voice command patterns are generated. The unrecognized voice command patterns, along with the one or more proposed resolution actions, are sent to the radio manager 102, where a selection is made as to the appropriate resolution action for the pattern.

The proposed resolution actions may include, but are not limited to: inspection and/or repair of the radio 110 (including audio accessories), investigation and/or training directed to a specific user 130, or changes to one or more target strings in the codeplug 120 of radio 110 to improve voice recognition performance. The generated resolution actions are associated with various detected unrecognized voice command patterns. In some environments, it may be that the tier of audio hardware can be improved, at the discretion of the radio manager 102. High tier and low tier audio may provide performance differences which can be reflected in the ability of the radio 110 to recognize certain key words.

The voice recognition target strings may be stored with the radio firmware or separate from the radio firmware, in flash or other non-volatile memory, and/or as part of the radio's configuration data, also known as the codeplug. The target strings may be further subdivided such that at least a first set is stored in a first location and at least a second set is stored in a second location. For example, target strings associated with "well-known" and/or fixed commands may be stored separately from target strings associated with channel names.

During the first stage of operation, a voice command vocabulary of key words or phrases, referred to as voice recognition target strings, are either initially created or updated by the radio manager 102. It is strongly desired to detect these target strings reliably and this further includes discerning between target strings that may sound similar. After the new codeplugs are created or revised in the radio management system 104, the target strings, in text form, are sent to a confusability analyzer 108, which analyzes the target strings and determines the likelihood of two or more strings being confused by the automatic speech recognition in the radio. The confusability analyzer 108 outputs a confusability index list corresponding to the list of target strings. The radio management system 104, and the radio manager 102, are alerted to index entries below a threshold such that is there is reasonable expectation no two strings may be confused. Radio manager 102 then makes adjustments to any target string such that no entry falls below the threshold. At this point there is an expectation of good recognition across different speakers, and the codeplugs may be programmed into the codeplug database 106 and deployed to radios 110.

Codeplug database 106 contains a large number of codeplugs, typically one codeplug for each radio 110 (#1-N). It is likely that the voice recognition target strings are the same of all codeplugs or a large set of codeplugs. Accordingly, it is not necessary to run the confusability analyzer 108 on each individual codeplug. It is sufficient to run the confusability analyzer 108 on each unique list of voice recognition target strings.

The second stage of operation, operating in accordance with the embodiments, occurs once the radios 110 are deployed to the field and the voice control feature is utilized. If the voice recognition engine 116 fails to recognize a voice command or portion thereof, then the unrecognized voice command is logged to the unrecognized voice command entry logger 118 within each radio 108. Unrecognized commands may be caused by a number of reasons, such as a newly-developed hardware problem with a particular radio that impairs recognition, or a new user/employee that may have difficultly pronouncing a particular target string. Unrecognized voice commands may be further exacerbated by certain use cases where multiple users share the same radio. For example, a group of radios may be used by one work shift of personnel and then turned in for another shift of personnel in public safety and industrial environments.

During second stage operation, the automatic speech recognition (ASR) engine 116 of each of the portable radios 110 provides voice command entry detection. In accordance with the embodiments, unrecognized voice command entry logger 118 of each radio logs each ASR unrecognized voice command, including any or all of the following log data 119: a partial ASR result, the audio sample of the actual voice command, channel subsequent user interface (UI) actions, user ID, context information, and biometric information.

The log data 119 for each unrecognized voice command may thus enable post mortem analysis to determine the cause of the unrecognized voice command and to ultimately improve recognition. Some of the log data 119 may provide context for a failure which may avert analysis for a particular unrecognized voice command. In a first example, a sudden, loud ambient noise such as a horn or explosion during the voice command could disrupt the ASR. In a second example, the biometric meta-data may be indicative of high stress, such as a foot chase, which may allow the voice control analytics engine 124 to discard an entry. In accordance with the embodiments, the logged data associated with the unrecognized voice command is periodically uploaded to a cloud based data lake 122. In accordance with some embodiments, local log data 119 may be deleted to reclaim space upon successful upload.

For example, during the second stage of operation, one or more portable radio users 130 may need to change channels and/or talkgroups and such talkgroups may have aliases for each agency. A user 130 may initiate voice control with a designated user input button or a wake word and subsequently issue a select channel command to change talkgroup, such a "SWAT", "FIRE", "Sherriff". If user 130 requests "Select Channel SWAT" which is not recognized by ASR engine 116, and the user subsequently changes the channel to channel 7 (the "SWAT" channel), the audio sample, the manual user action to select channel 7, and other context information is saved by failed voice command entry logger 118.

It should be appreciated that the first stage of operation is either a single event or a very infrequent event. The first stage happens during initial provisioning of the radios and the creation of the codeplugs. Additionally, the codeplugs can be expected to be updated over time, which may involve new or changed target strings. In such a case the first stage may run again after the update to ensure the confusability analyzer 108 does find any new problems prior to deployment to the radios. Such updates are typically infrequent and may occur once per month or less often. In contrast, the second stage of operation is continuous on all devices at all times. As unrecognized voice command entries occur, data pertaining to the unrecognized voice command is logged at logger 118 and periodically uploaded to the cloud for analysis.

In accordance with the embodiments, during the third stage of operation, the uploaded log data of unrecognized voice command attempts is aggregated in data lake 122. The cloud-based data is periodically analyzed by a cloud based control voice control analytics engine 124. The voice control analytics engine 124 analyzes the unrecognized voice commands to determine patterns associated therewith. The unrecognized voice command patterns are transferred to a resolutions action engine 126 to determine what type of actions can be taken to identify and/or resolve the unrecognized command. The pattern and proposed resolution actions are forwarded to the radio manager 102. Depending on the type of pattern, the radio manager 102 may opt to wirelessly update the codeplug 120 with the new word or phrase, which the ASR engine 116 accesses at power-up of the portable radio 110. The radio manager 102 may further verify the new word or phrase through the confusability analyzer 108 for storing within the radio management codeplug database 106. Alternatively, if the unrecognized pattern is based on a device failure, such as a clogged microphone port, then the radio management system may automatically send a "Service Required" message to the portable, thereby alerting the user of the need to bring the portable radio in for service. As another example, where higher tier hardware audio is available, such as through a remote speaker microphone accessory, then the radio management system 104 may send an "Audio Upgrade Recommended" alert message to the portable radio thereby alerting the user of the option to upgrade the audio. Hardware upgrades are performed by the radio manager 102, while software upgrades may be performed over the air by the radio management system 104 under the control of radio manager 102.

Figure 2:
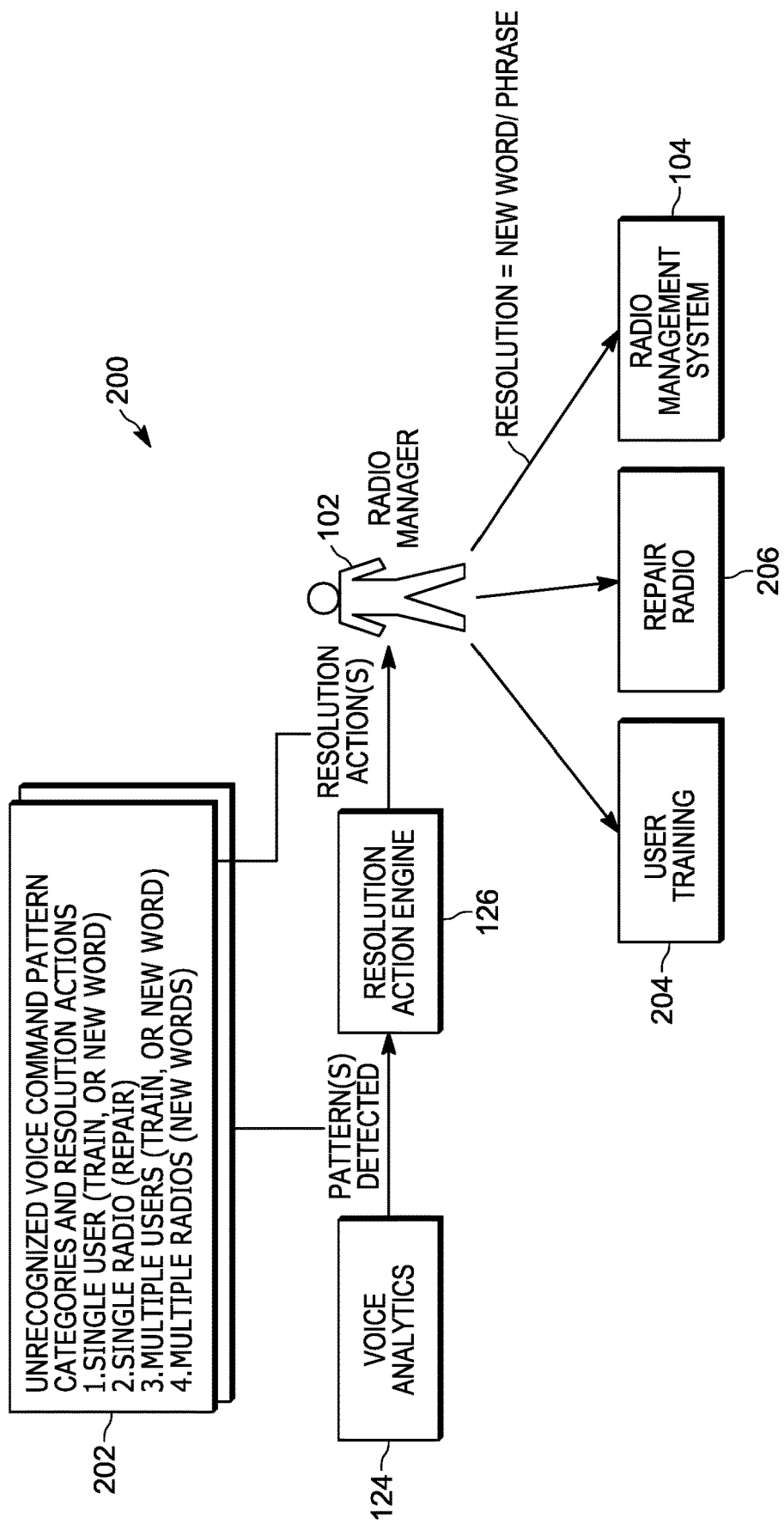
FIG. 2 is a block diagram further detailing the cloud based operation portion of the communication system of FIG. 1 for the categorization of unrecognized voice command patterns and generation of resolution actions in accordance with some embodiments.

FIG. 2 is a block diagram further detailing the cloud based operation portion of the communication system of FIG. 1 for the categorization of unrecognized voice command patterns and resolution actions in accordance with some embodiments. Voice control analytics engine 124 operating in the cloud searches and detects patterns within the stored unrecognized voice command data of data lake 122. A plurality of unrecognized voice command pattern categories may be detected by the voice control analytics engine 124, and corresponding resolutions are then generated by the resolution action engine 126. The pattern categories and resolutions 202 may comprise: (1) executing a first resolution action for an unrecognized voice command associated with a single user, (2) executing a second resolution action for an unrecognized voice command at a single radio, (3) executing a third resolution action for an unrecognized voice command across a plurality of users, and (4) executing a fourth resolution action for an unrecognized voice command across a plurality of radios (for example, a fleet of radios).

In accordance with the embodiments, a unrecognized voice command notification with associated resolution actions is forwarded by the resolution action engine 126 to the radio management system 104 via wireless communication means, such as email, instant message, or other broadband wireless notification means. The radio management system 104 provides the notification with associated resolution actions to radio manager 102, whereupon resolution actions can be decided upon. The notification and associated resolution actions may be an audible alert or warning and/or a displayed pop-up alert, an email, or a dedicated status screen at the radio management system 104. The operation of voice control analytics engine 124 and resolution action engine 126 are periodic and need not run continuously. Execution of the third stage may be, for example, in the range of once per day to once per week. The periodicity may be adjusted based on factors such as, radio fleet size, organization type, radio usage profile, and user habits, to name a few. In accordance with some embodiments, the periodicity of the cloud based operations can be increased based on an increase in download frequency occurrences of unrecognized voice commands. In other words, an increase in the number of unrecognized voice command attempts may be an indication of the need for a new command or an indicator of a faulty unit. The resolution actions may comprise one or more of user training 204, radio repair 206, or uploading the new word or phrase to the radio management system 104 for upload to the portable radio.

In a first pattern category, an unrecognized voice pattern is detected and categorized by voice control analytics engine 124 as a single user unrecognized voice command pattern based on a particular word or phrase spoken into the radio by the single user. The resolution action to an incorrect (i.e. unrecognized) word or phrase entered by a single user to portable radio 110 may be training for that user to say the correct word. Alternatively, the resolution to an incorrect word or phrase entered by a single user may be to have the system learn that new word or phrase. The ability to have a new word or phrase uploaded to the radio management system 104 advantageously allows for the codeplug of the portable radio 110 to be updated while the portable radio remains in the field.

In a second pattern category, an unrecognized voice command pattern may be detected and categorized as a single radio pattern. In this case the voice control analytics engine 124 detects that the spoken word or phrase has been impacted in a negative manner, either electrically and/or mechanically. For example, a blocked microphone port may result in a pattern associated with garbled audio. A resolution action to the single radio unrecognized voice pattern is determined by the resolution action engine 126. The resolution to a single radio unrecognized voice pattern may be to have the radio taken in for repair. A notification and associated repair resolution action are forwarded to the radio management system 104 which alerts the radio manager 102, as previously described. The radio manager 102 then instructs the radio management system 104 to transmit a message to the portable radio 110 still deployed in the field indicating to the user 130 that the portable radio is in need of repair 206. For example, a display of the portable radio 110 may read "blocked mic port, please return for service" or "maintenance required" and/or the radio speaker may generate similar audible messages or alert tones.

In a third pattern category, an unrecognized voice command pattern may be detected and categorized as a multiple radio users of a single radio pattern. In this case the voice control analytics engine 124 detects that the words or phrases spoken by several users, such as users that share one radio over different shifts) have produced similar error patterns. A resolution action to the multiple user pattern is determined by the resolution action engine 126. The resolution action to an incorrect (i.e. unrecognized) word or phrase by multiple users to a single radio may be training of those users to say the correct word or phrase. Alternatively, the resolution to an incorrect word or phrase by multiple users to a single radio may be to have the system learn that new word or phrase. Both resolution options can be generated and forwarded to the radio management system 104 for notification to radio manager 102, as previously described. The radio manager 102 then reviews the notification with associated resolution actions and determines which resolution action to take. The radio management system 104 then transmits a message to the single portable radio still deployed in the field with one of: training to the users 130 or uploading the new word or phrase to the portable radio codeplug 120. The ability to have a new word or phrase uploaded by radio management system 104 advantageously allows for the codeplug 120 of each portable radio 110 of a fleet to be updated while the portable radios remains in the field.

In a fourth pattern category, an unrecognized voice command pattern may be detected and categorized as being a multiple radios pattern. In other words similar commands may be made by different users into different radios of a fleet. In this case, the voice control analytics engine 124 detects that the spoken words or phrases, which are incorrect or unrecognized, are being used by the plurality of radios in a manner sufficient to create repeatable patterns. The resolution action to the multiple radio unrecognized voice command patterns may be to have the radio management system 104 learn the unrecognized words or phrases as a new word or phrase. The multiple radio unrecognized voice command pattern and associated resolution action are forwarded to the radio management system 104 for review by radio manager 102. The radio manager 102 reviews the resolution action to determine if the new word or phrase should be uploaded to each portable radio codeplug #1-N within the fleet. The ability to have a new word or phrase uploaded by radio management system 104 advantageously allows for the codeplug 120 of each portable radio 110 of a fleet to be updated while the portable radios remains in the field.

Additionally, as previously mentioned, the codeplugs 120 of the radio and/or fleet can be expected to be updated over time with new or changed target strings. In these cases, the first stage of operation may be run again by the radio management system 104, after the in-field update has been made, to ensure the confusability analyzer 108 does not detect any new problems prior to re-deployment of the radios. Thus, updated voice commands can be reviewed and revised if needed prior to re-deployment of the radios to the field.

In accordance with the embodiments, unrecognized voice command flag generation may be based on the user, or the device, or a voice command. For example, an unrecognized voice command related to a device may be a microphone failure; a failure based in part on differences in tier of hardware used by the speaker where the sample rates may be of a high tier quality or a low tier quality. An accent or external noise, such as a nearby motorbike may impact intelligibility. A radio communicating via a newly attached accessory, such as a remote speaker microphone (RSM) having a different audio configuration based on wind porting may cause a failed voice command.

In some embodiments, it may be desirable to display an unrecognized voice command count or some other indicator at the portable radio 110 so that the user 132 is made aware of the unrecognized voice command. The radio ASR's inability to recognize a voice command entry need not be interpreted as a failure to a user, but rather as a condition in which the user is provided with information pertaining to the radio's ability to increase voice command recognition, and/or make the user aware of a need for radio service. For example, if a command pertaining to channel change or volume control were to go unrecognized by the radio ASR engine 116, the user 130 can be notified to revert to manual control of those radio functions, while updates to the codeplug are being considered by the radio manager. If the notification is more difficult to communicate to the user (for example if the portable radio is a non-display radio or the portable radio is operating in a noisy environment where audible alerts cannot be heard), then a severity level of the unrecognized voice command can be logged as part of the log data 119 for uploading to the cloud for consideration during analytics and action resolution.

Figure 3:
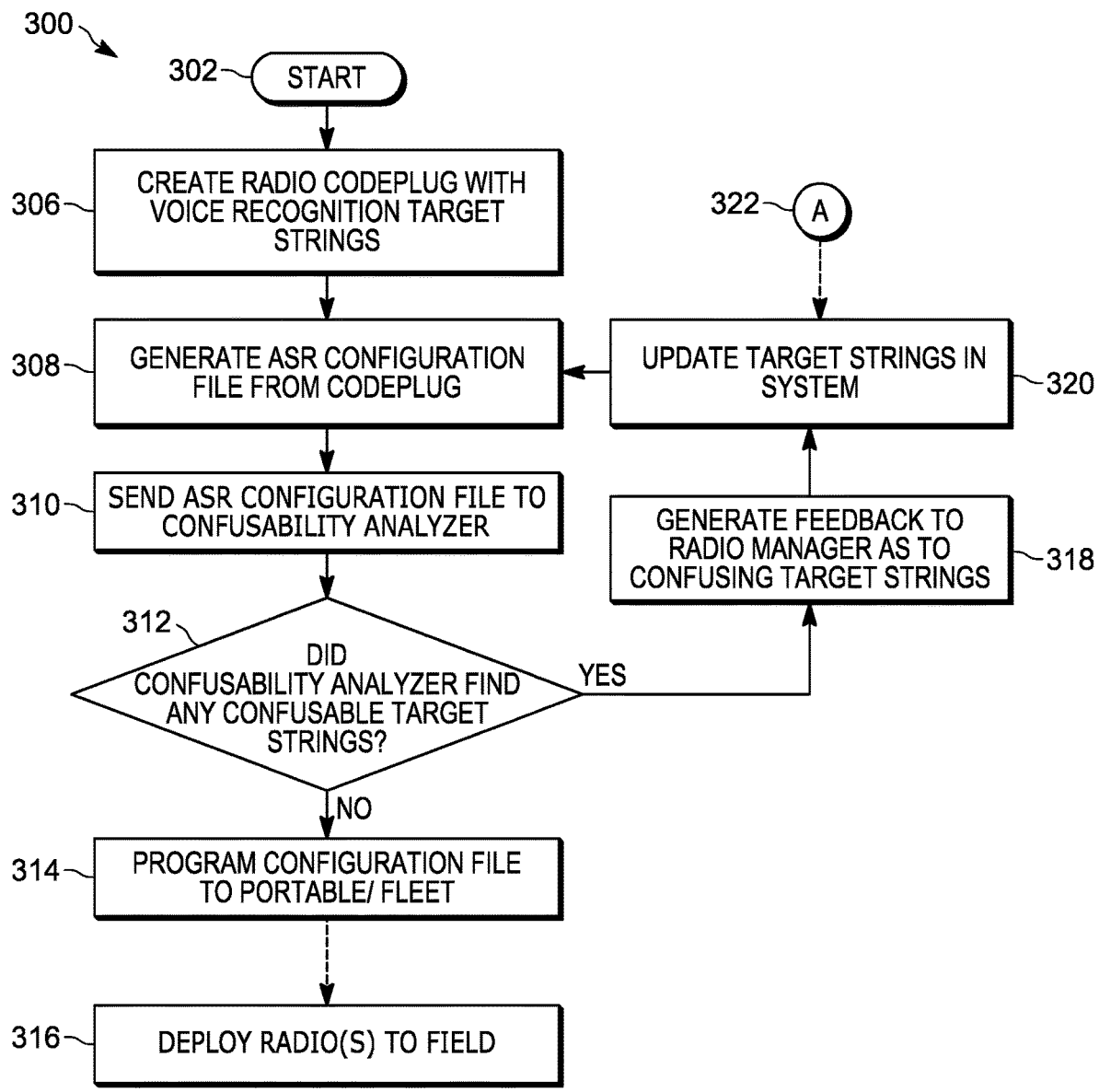
FIG. 3 is a method of configuring a codeplug as part of a pre-deployment radio configuration in accordance with some embodiments.

FIG. 3 is a method of configuring a codeplug as part of a pre-deployment radio configuration method in accordance with some embodiments. Method 300 provides for the first stage of operation of communication system 100 of FIG. 1. Method 300 begins at 302 by creating a codeplug at 306. The codeplug is created by a radio manager, such as radio manager 102 of FIG. 1. The codeplug comprises a plurality voice recognition target strings. Codeplug information created by the radio manager could be, for example, talkgroup aliases, channel assignment, volume control and other strings associated with control of the radio. An automatic speech recognition (ASR) configuration file is generated at 308 by the radio management system based on the codeplug. For example, the radio management system 104 may generate an ASR configuration file from codeplug talkgroup aliases or a channel list. The ASR configuration file, containing the voice recognition target strings, is then sent to a confusability analyzer, such as the confusability analyzer 108 of FIG. 1, for processing at 310, and generation of confusability index list associated with the voice recognition target strings. At 312, the confusability analyzer determines if there are any confusable voice recognition target strings. For example, the confusability analyzer may determine that a voice recognition target string associated with talkgroup aliases is or is not likely to cause confusion to an end user, based on a predetermined confusability threshold. If the voice recognition target string is not confusing, then the configuration file containing the voice recognition target string can be programmed to the radio codeplug of a portable radio or fleet of radios at 314, and the one or more portable radios are then deployed to the field at 316. The confusability analyzer can thus be said to present, to the radio management system, voice recognition target strings whose likelihood of confusion falls below a predetermined confusability threshold.

If confusability analyzer does make a determination of a confusing voice recognition target string at 312, then feedback pertaining to the confusing string is fed back to the radio manager, such as the radio manager 102 of FIG. 1. For example, feedback pertaining to the confusing talkgroup aliases may be sent to the radio manager 102. The radio manager then updates the radio management system at 320 with a new voice recognition target string for the regeneration of an ASR configuration at 308. For example, updated talkgroup aliases may be fed back to the radio management system 104 for the regeneration of ASR configuration at 308.

Figure 4:
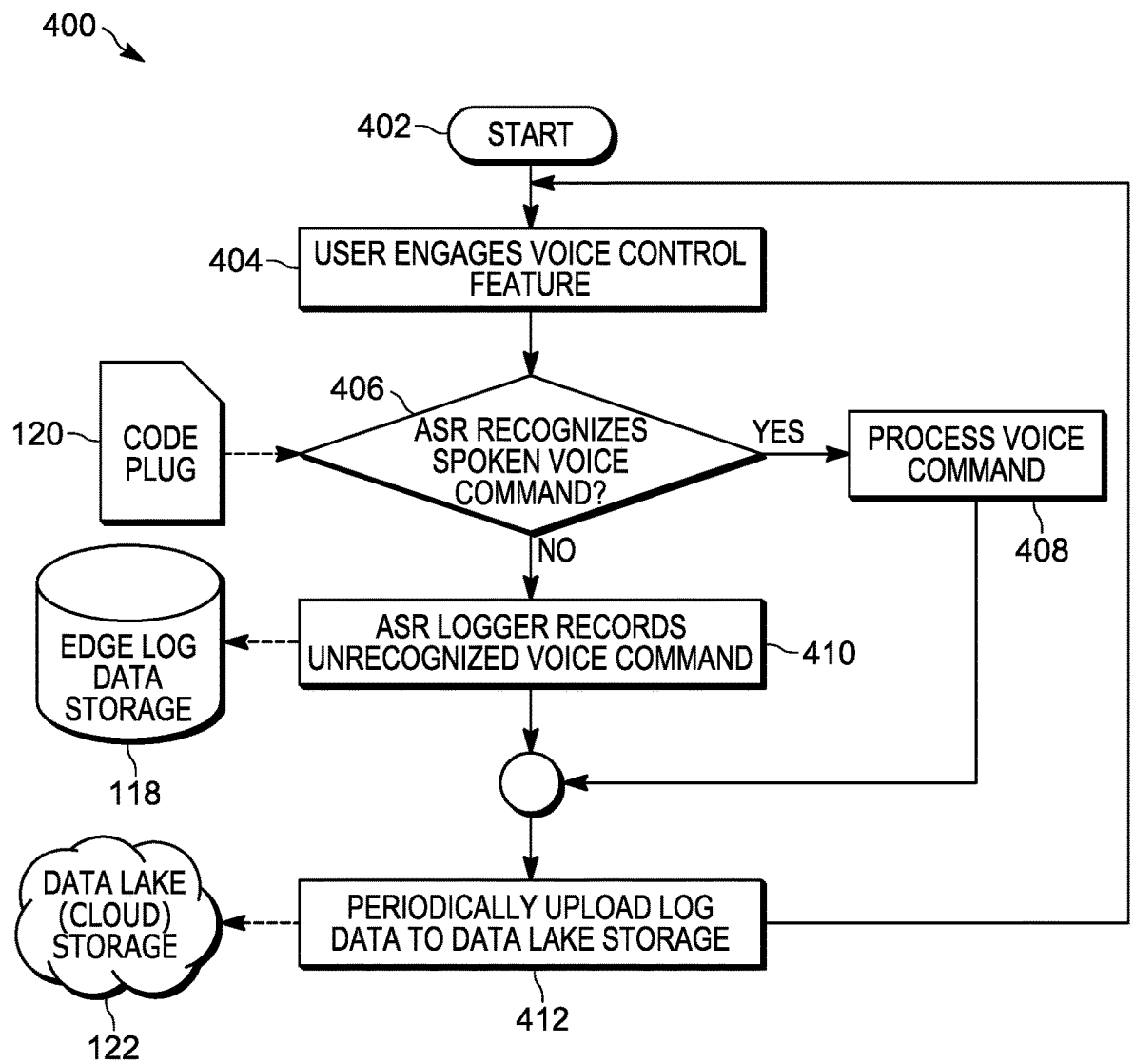
FIG. 4 is a method of detecting, storing, and reporting unrecognized voice commands of deployed portable radios in the field in accordance with some embodiments.

FIG. 4 is a method 400 of detecting and storing unrecognized voice commands of deployed portable radios in the field in accordance with some embodiments. Method 400 provides for the second stage of operation of communication system 100 of FIG. 1. The method of FIG. 4 takes place during radio operation in the field, and is performed in the background during normal user operation. The portable radio operating in the field is considered to be an edge device. Starting at 402, the user engages in voice control of his or her deployed radio at 404. The voice control feature may be engaged by, for example, a button press, wake word, or some other trigger. A spoken voice command may or may not be recognized by the portable radio ASR at 406. For example, a spoken talkgroup alias may or may not be recognized by the radio ASR 116 of FIG. 1. If voice command aligns with a command of configuration file in codeplug 120, the command will be recognized at 406 and processed at 408. If the spoken voice command is not recognized at 406, then the failed metadata and audio are logged at 410 to an edge data storage unit, such as failed voice command entry logger 118 of portable radio 110 of FIG. 1. The portable radio 110 operating at the edge, thus records at 410, the result of the automatic speech recognition (ASR) as logging data. The logging data may comprise, in accordance with some embodiments, at least one of: user ID, channel/talkgroup name, biometric data, context data, recognition result, or audio sample. Periodic uploading of the logged data, including the failed metadata and audio, to the data lake cloud occurs at 412.

Figure 5:
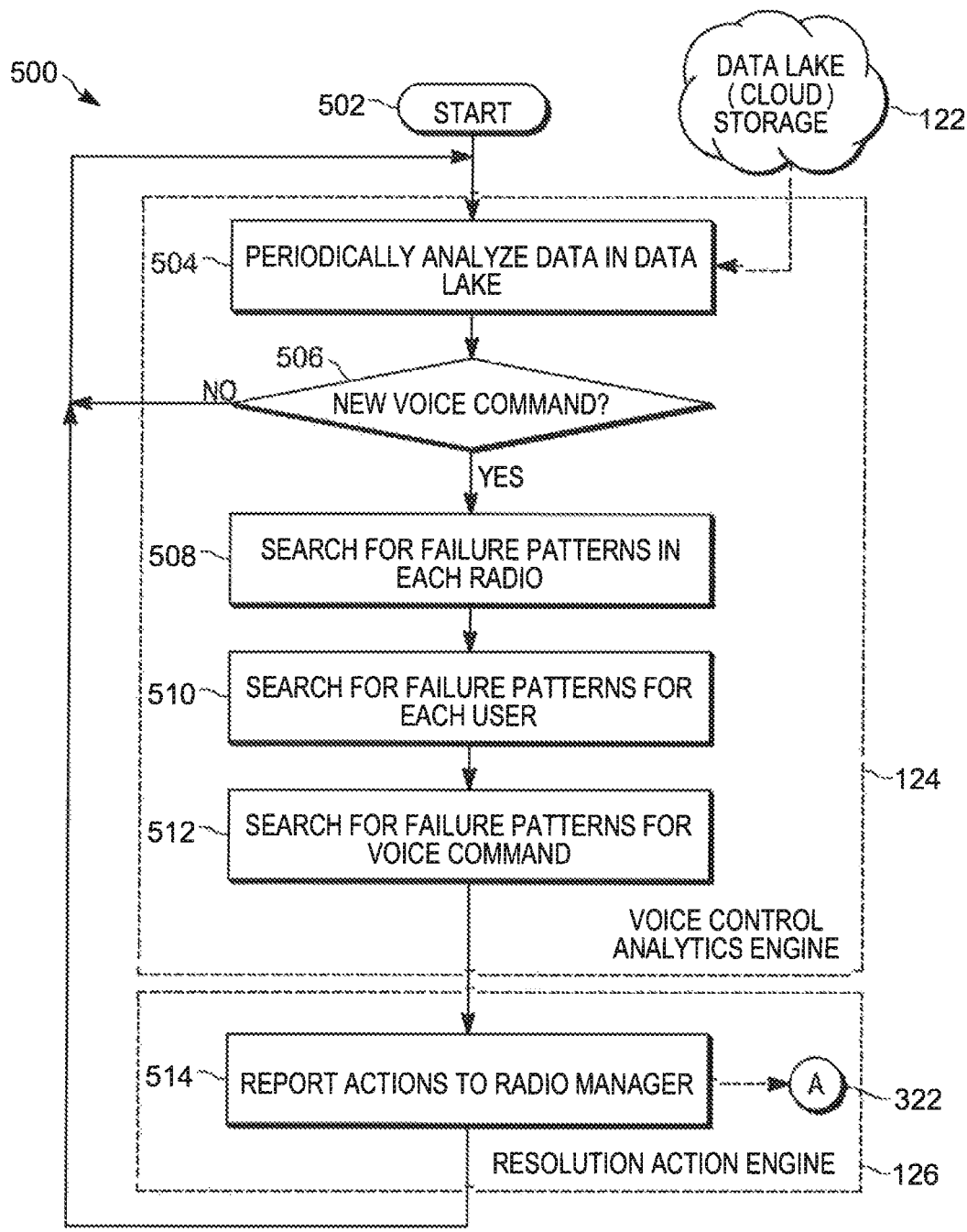
FIG. 5 is a method of determining unrecognized voice command patterns, and the generation of resolution actions for those unrecognized voice command patterns for the deployed portable radios in the field in accordance with some embodiments.

FIG. 5 is a method 500 of determining unrecognized voice command patterns and the generation of resolutions actions for those patterns for the deployed portable radios in the field in accordance with some embodiments. Method 500 provides for the third stage of operation of communication system 100 of FIG. 1. The method 500 preferably takes place periodically at the cloud. Method 500 begins at 502 by periodically analyzing the data in the data lake. This stored data comprises the failed voice command entries, and may further comprise other stored data, such as the. The periodic analysis of the data lake is used to detect repeated voice patterns indicative of new voice command at 506. In accordance with some embodiments, the new voice command may fall into at least one of four patterns of unrecognized voice recognition commands.

Once the new voice command detected at 506, then the resolutions action engine of the cloud performs a plurality of searches to distinguish unrecognized command patterns. In no particular order, a search for unrecognized voice command patterns in each radio takes place at 508. A search for unrecognized voice command patterns for each user takes place at 510. A search for unrecognized voice command patterns type takes place at 512. The searches 508, 510, 512 will result in at least one of the four pattern categories (single user, single radio, multiple users, multiple radios) and corresponding resolutions actions being generated. The pattern type and associated resolution actions are determined and reported to the radio manager at 514 for selection of the resolution action. The method returns back to 322 so that the radio manager can take the action. For example, the radio manager can update vernacular information which is then uploaded to the system for updated ASR configuration files to the code plug at 308. In parallel the system continues to periodically analyze data in the data lake at 504.

Accordingly, there has been provided a communication system, apparatus and method that provide a voice control feature for deployment in a radio. The voice control feature advantageously enables control of a variety of radio features and allows for the optimization of the voice control feature post deployment. Radio voice control features such as such as talkgroup searches, channel assignment, volume level updates, and other agency related commands and controls, such as officer status updates (e.g. en route, on scene, incident closed). The ability to customize different vocabularies for different agencies is highly beneficial to the public safety market where different agencies utilize different work vernacular. The management of speech recognition, in accordance with the various embodiments, avoids the use of continuous trial and error via the use of periodic analysis thereby providing for a time efficient approach well suited to public safety agencies. The ability to quickly flag unrecognized voice commands and identify resolution actions to those commands minimizes the spread of failed commands across a fleet.

While the preferred embodiments utilize cloud based analytics for determining patterns associated with the unrecognized voice commands and generating associated resolution actions, it can be appreciated that these analytics may alternatively take place at servers installed on the customer premise. In such embodiments, the portable radio 110 of FIG. 1 still comprises the codeplug 120 pre-programmed with a configuration file of a voice recognition target string, an automatic speech recognition (ASR) engine 116 providing voice command entry detection, a data logger 118 for logging data pertaining to an unrecognized voice command entry detected by the ASR engine. The portable radio in such embodiments, just as previously described, uploads the logged data to remote storage for voice control analytics and resolution action.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable radio, comprising:
 a codeplug pre-programmed with a configuration file of a voice recognition target string;
 an automatic speech recognition (ASR) engine providing voice command entry detection;
 an unrecognized voice command entry logger for logging unrecognized voice command entries, the unrecognized voice command entries not being recognized as voice recognition target strings, and for storing log data comprising user ID, radio channel, talkgroup name, biometric data, context data, and audio sample for each unrecognized voice command entry; and
 the portable radio uploading each logged unrecognized voice command entry with log data pertaining thereto to cloud based data-storage for voice control analytics and resolution action.

2. The portable radio of claim 1, wherein the portable radio is a Land Mobile Radio (LMR).

3. The portable radio of claim 1, wherein the voice command entry detection and logging of the unrecognized voice command entry occurs continuously at the portable radio, and the uploading of each logged unrecognized voice command entry with log data pertaining thereto to cloud based data storage occurs periodically, wherein periodicity of the uploading is adjustable based on frequency of occurrence of the unrecognized voice command entry.

4. The portable radio of claim 1, wherein the voice control analytics and resolution action are also cloud based, and the voice control analytics detects a pattern in the uploaded logged data for categorization of the unrecognized voice command entry, and the resolution action provides at least one resolution action associated with the categorization of the unrecognized voice command entry.

5. The portable radio of claim 1, wherein the resolution action for an unrecognized voice command entry is one of:
 user training;
 radio repair; and
 uploading of a new word or phrase of the unrecognized voice command to the portable radio.

6. A method to manage voice recognition in a portable radio, comprising the steps of:
 pre-programming a plurality of portable radio codeplugs with voice recognition target strings pre-deployment of the plurality of portable radios;
 deploying the plurality of portable radios, thereby providing post-deployed portable radios;
 detecting an unrecognized voice command entry to at least one post-deployed portable radios;
 storing, at the portable radio, the unrecognized voice command entry along with logging data pertaining to the unrecognized voice command entry, the logging data comprising of: user ID, radio channel, talkgroup name, biometric data, context data, and audio sample; and
 uploading the unrecognized voice command entry and logging data to a data lake storage for pattern analysis by a voice control analytics engine and generation of a resolution action by a resolutions engine.

7. The portable radio of claim 1, wherein the voice recognition target strings are stored to the code plug of the portable radio prior to field-deployment, and the portable radio uploading each logged unrecognized voice command entry with log data pertaining thereto to cloud based data-storage for voice control analytics and resolution action takes place post-field deployment.

\* \* \* \* \*